United States Patent [19]

Franke

[11] Patent Number: 5,474,185

[45] Date of Patent: Dec. 12, 1995

[54] PROTECTIVE PACKAGING FOR FURNITURE, ELECTRICAL APPARATUS AND THE LIKE

[75] Inventor: Michael Franke, Munich, Germany

[73] Assignee: Deuter Sport und Leder GmbH, Augsburg, Germany

[21] Appl. No.: 984,776

[22] Filed: Feb. 4, 1993

[30] Foreign Application Priority Data

Dec. 3, 1991 [DE] Germany ............... 41 39 856.4
Oct. 26, 1992 [DE] Germany ............... 42 36 127.3

[51] Int. Cl.$^6$ ............... B65D 81/14; B65D 85/00; B65D 65/02
[52] U.S. Cl. ............... 206/586; 150/158; 150/165; 206/320; 206/326
[58] Field of Search ............... 206/521, 586, 206/453, 320, 326; 150/154, 158, 165

[56] References Cited

U.S. PATENT DOCUMENTS

| | | | |
|---|---|---|---|
| 801,279 | 10/1905 | Van Slyke | 206/326 X |
| 1,607,122 | 11/1926 | Gifford . | |
| 1,822,899 | 9/1931 | Malis | 206/521 |
| 1,866,963 | 7/1932 | Campbell | 206/326 X |
| 1,951,604 | 3/1934 | Friedlander | 206/326 X |
| 2,992,668 | 7/1961 | Collard | 150/165 |
| 3,066,435 | 12/1962 | Oddo et al. | 150/158 X |
| 3,346,101 | 10/1967 | Pestka . | |
| 3,490,469 | 1/1970 | Dubinsky | 150/158 X |
| 3,504,842 | 4/1970 | Grafslund . | |
| 3,663,969 | 1/1972 | Wininger | 206/326 X |
| 5,050,654 | 9/1991 | Howell et al. | 150/158 |
| 5,143,133 | 9/1992 | Speckman | 150/158 |

FOREIGN PATENT DOCUMENTS 8904373.1 7/1989 Germany .
8905519.5 10/1990 Germany .

*Primary Examiner*—Bryon P. Gehman
*Attorney, Agent, or Firm*—Jacobson, Price, Holman & Stern

[57] ABSTRACT

The invention concerns a packaging for an object (4), where the packaging protectively encloses the object (4) on one surface and the adjacent other surfaces. The packaging displays the form of a flexible protective covering (1) open on one end, which can be slipped over object (4). In its edge and corner portions, protective covering (1) is to be provided with shock-absorbing fittings (3) of a predetermined thickness, so that these installations serve an alignment or adjustment function during application of the protective covering (1) to the object (4).

40 Claims, 7 Drawing Sheets

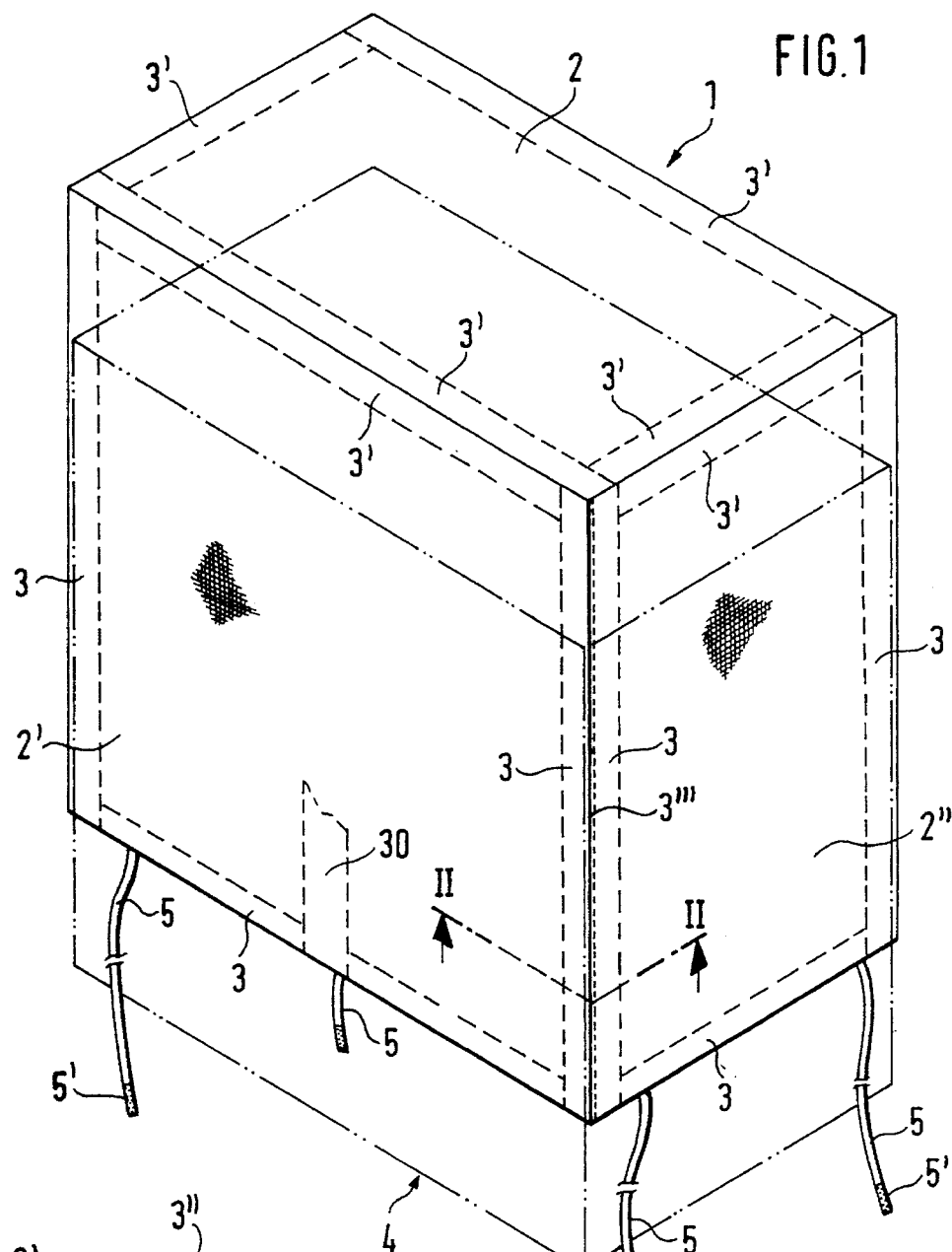
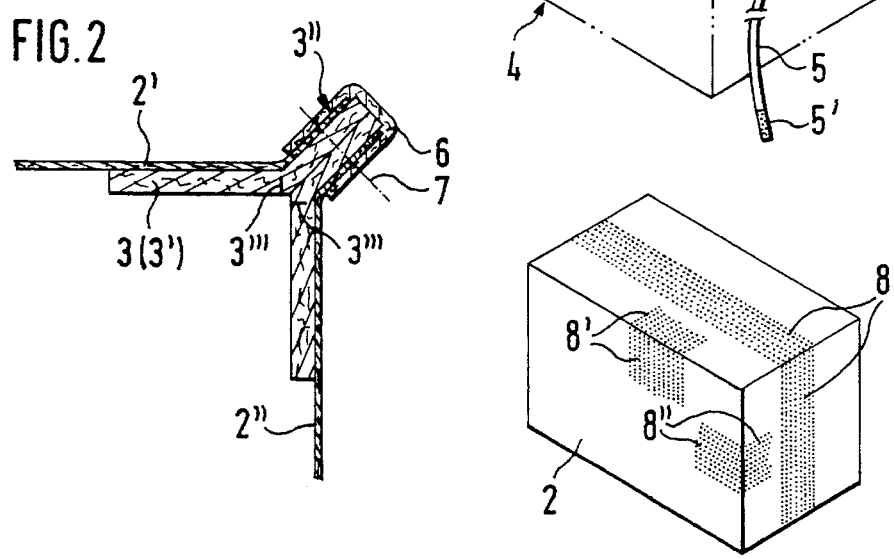
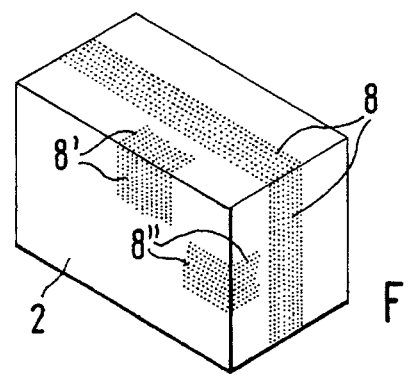

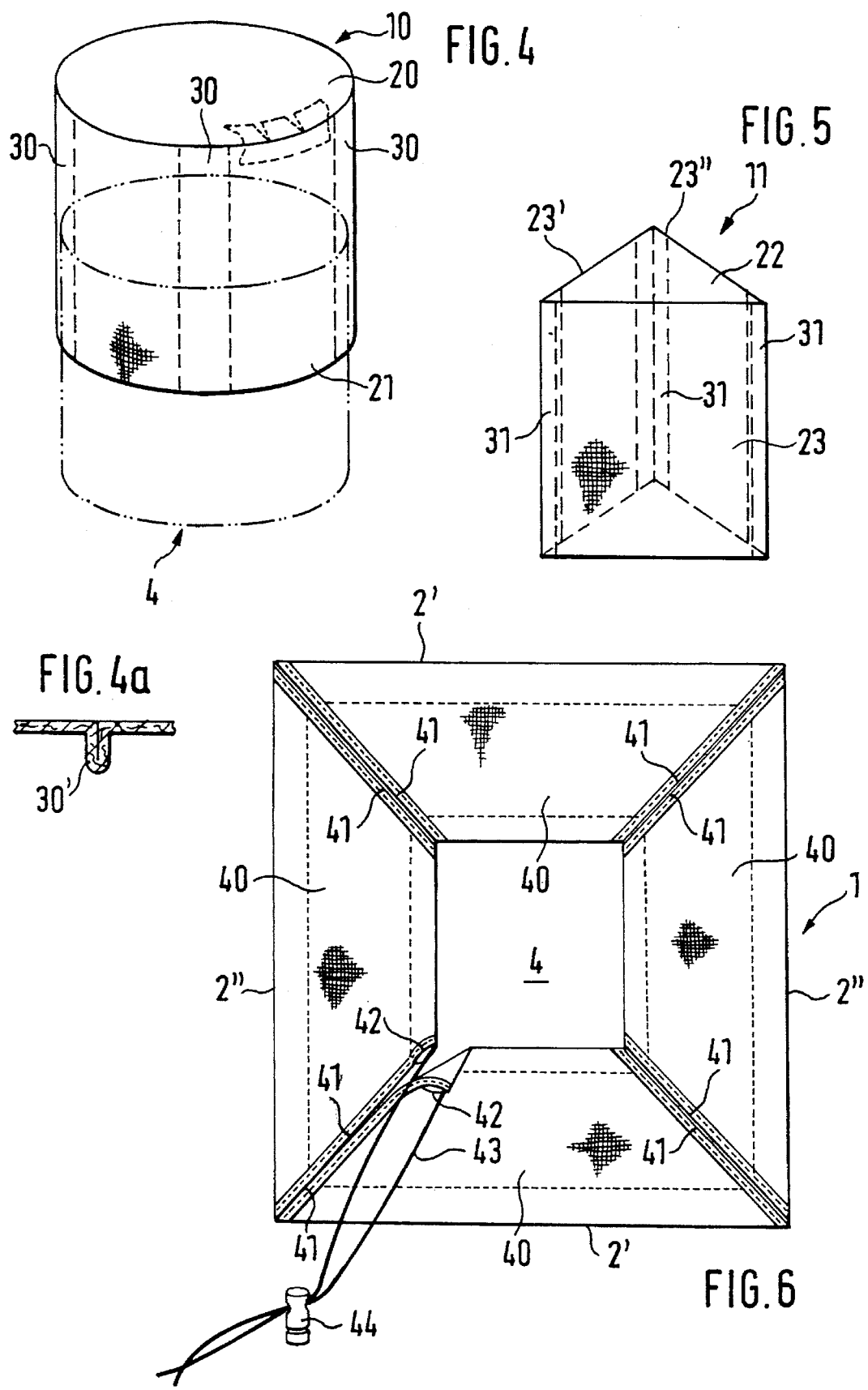

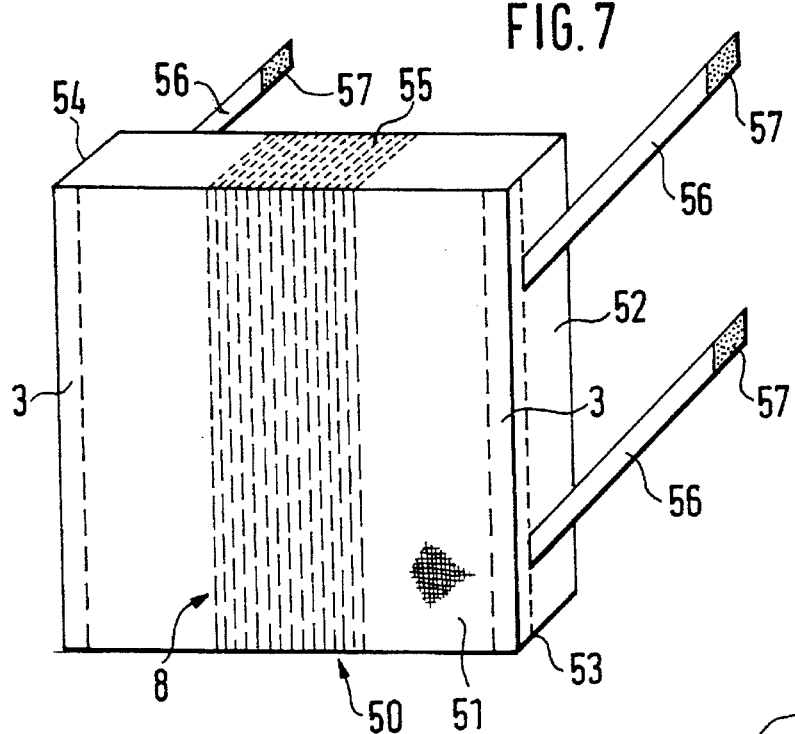
FIG. 7
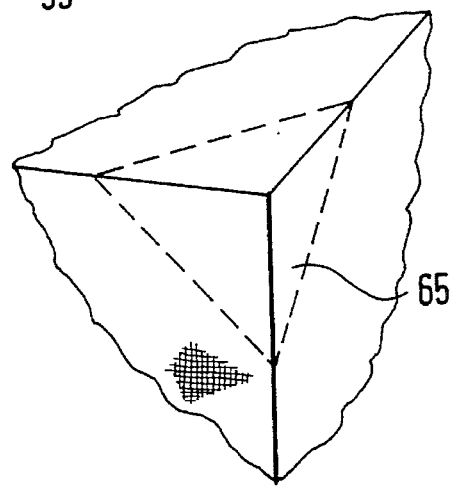
FIG. 9
FIG. 8
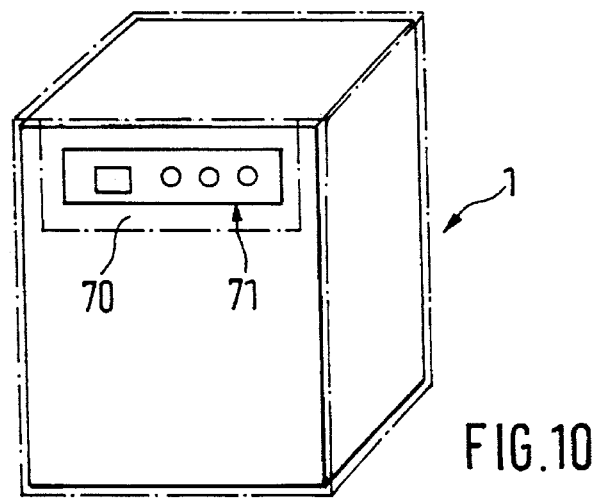
FIG. 10

5,474,185

PROTECTIVE PACKAGING FOR FURNITURE, ELECTRICAL APPARATUS AND THE LIKE

FIELD OF THE INVENTION

The invention concerns a packaging for objects, in particular furniture, electrical apparatus and the like, in accordance with the preamble of claim 1.

BACKGROUND OF THE INVENTION

Furniture items in the furniture industry and electrical apparatus in the electrical industry are typically provided with packaging for shipping or delivery, which preferably comprise styrofoam parts enclosing the furniture or electrical apparatus from two sides and cardboard boxes, into which the furniture or electrical apparatus and the styrofoam parts are inserted. One problem of that type of packaging consists in that they are not environmentally beneficial, particularly because of the styrofoam parts. After the purchase or delivery of the furniture or electrical apparatus, these known types of packaging normally remain behind with the purchaser, so that he himself must see to the disposal of the bulky packaging.

The problem of the present invention, therefore, consists in creating a packaging for furniture, electrical apparatus and the like which is reusable, environmentally beneficial and essentially recyclable.

This problem is solved by a packaging of the type mentioned initially, which is characterized by the features outlined in the characterizing portion of claim 1.

DESCRIPTION OF THE INVENTION

The essential advantage of the invention consists in that the present packaging contains no bulky, unrecyclable parts, such as styrofoam parts and cardboard boxes. It is advantageous that the present packaging can be reused very frequently, for instance, up to one hundred times, so that many, pieces of furniture or electrical apparatus, up to one hundred for instance, can be packaged with it, without requiring any new packaging materials. Since the packaging consists in essence of recyclable materials, for instance, cotton, jute, linen and other materials capable of rotting, the environment is virtually not impacted. After the removal of the present packaging from service, its components may be reused by continuing to use the aforementioned fabrics as filler materials, cleaning pads or cleaning rags. An additional essential advantage of the present packaging consists in the fact that it is so flexible that it may be folded up, so that before and after its utilization it may be piled up in a very small space. Large storage rooms are therefore not necessary. On those edge areas which come into contact with the edges of furniture or electrical apparatus during the use for which they are intended, the present packaging advantageously features an edge protection which has a kind of cushioning effect and simultaneously fulfills the function of a guide during application of the packaging so that the packaging can be pushed onto the furniture item from above or from the side in a simple manner, without any particular measures for this being necessary. For this previously mentioned reason, the present packaging is also suited to be applied to the apparatus or pieces of furniture automatically by special machines.

In a particularly preferred design of the invention, the present types of packaging feature flexible areas, so that they can be fitted to objects of differing sizes. This has the advantage that one and the same type of packaging can be used for objects of varying sizes. Therefore, it is not necessary to manufacture packaging of differing sizes.

Additional advantageous designs of the invention are derived from the subclaims.

BRIEF DESCRIPTION OF THE DRAWINGS

In the following, the inventions and its designs are explained further in conjunction with the figures. We have FIG. 1 a packaging in accordance with the invention in a schematic representation FIGS. 2–20 further developments of the invention.

In accordance with FIG. 1, an embodiment of the present packaging features a protective covering (1) adapted to the shape of an object (4), to be packaged, which may, for instance, be a cabinet, a shelf unit, an element of kitchen cabinetry or the like or an electrical apparatus, such as television set, an electric range, or the like. In the case illustrated, the object has the form of a rectangular block. Corresponding to that, the protective covering (1) features four side parts (2',2") and an upper part (2). Side parts (2',2") are connected together on their facing side edges. The upper edges of side parts (2'2") are connected to the edges of upper part (2). In this way, the protective covering (1), open at the bottom, results, which also shows the form of a rectangular block. Side parts (2',2") and upper part (2) consist of an environmentally benign, recyclable material, preferably cotton, jute linen or some other material which can degrade, unlike styrofoam or some other plastic material. Additionally, after being removed from service, side parts (2',2") and upper part (2) can be put to another use as filler materials, cleaning pads or cleaning rags, for instance. Side parts (2',2") and upper part (2) are preferably stitched together at the aforementioned edges.

Figure 12:
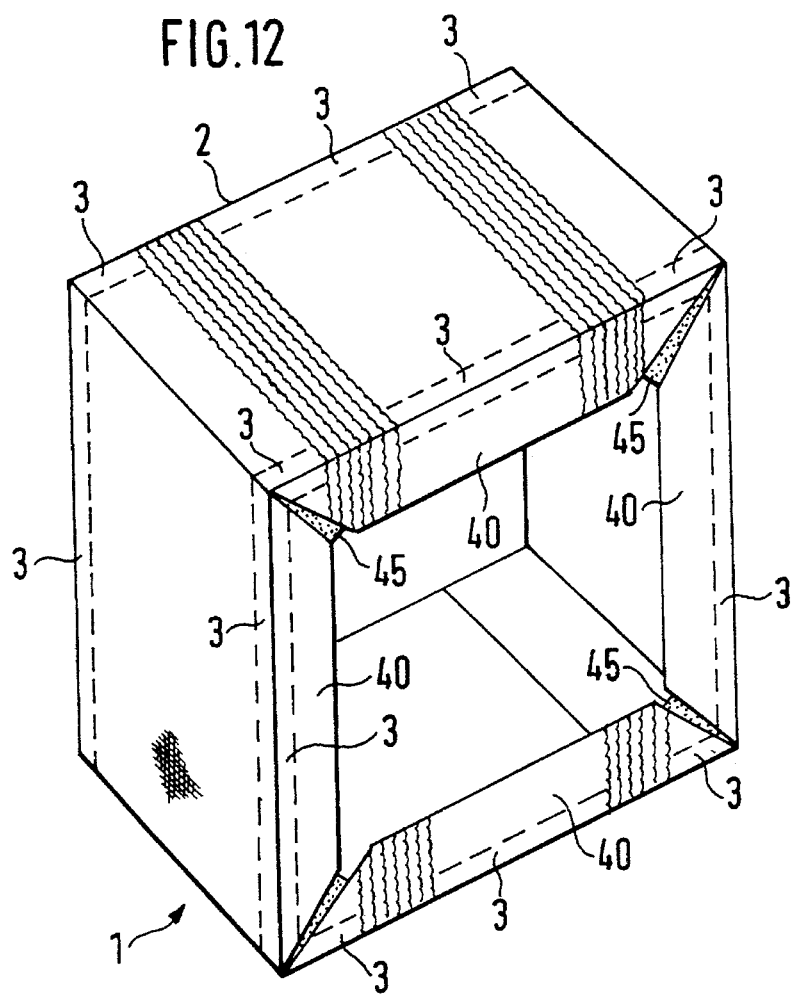

An essential characteristic of the present packaging consists in the fact that protective covering (1) contains a shock-absorbing insert (3) that serves as an edge protector for all four edges of object (4); said insert preferably displays the form of an angular piece surrounding the corner edges of object (4) in the assembled state of protective covering (1) and preferably consists of a shock-absorbing, elastic material. Felt is especially well-suited as a material for shock-absorbing insert (3). Since the angular shock-absorbing inserts (3), preferably consisting of felt, are attached on the inside corner areas of protective covering (1), they provide the latter with a certain stiffness. Shock-absorbing insert (3) therefore performs another essential function along with its shock-absorbing function. The angular inserts (3) also act as a type of guide rails during application of protective covering (1) to object (4), since they stiffen up protective covering (1). In this way, it is quite simple to slide protective covering (1) from above or from one side onto object (4), without the danger of the end of protective covering (1) still above object (4) twisting or bending in a manner that would disrupt the slide-on process, as would be very possible without the provision of shock-absorbing inserts (3), owing to the flexibility of the material of side parts (2',2") and upper part (2). This embodiment is therefore especially suited to be applied to objects (4) by means of robotic equipment, which preferably grabs onto the bottom edge areas of inserts (3) with four gripper arms or the like and pulls the packaging over object (4).

The upper ends of the shock-absorbing inserts (3) are preferably connected in the area of two opposing edges of upper part (2) or in the area of all four edges of upper part by additional angular shock-absorbing inserts (3'). In this way the upper edges of object (4) are also protected and during the assembly of protective covering (1) the upper part (2) is automatically brought into its proper position covering the upper surface of object (4).

It is also conceivable to provide such shock-absorbing installations in the area of the opening edges of the protective covering. It is also possible to provide strip-shaped inserts attached to the rim areas there, in place of angular inserts.

Fittings to fasten the protective covering (1) to the object (4) can be provided on at least two opposing edges of side parts (2') or (2"). These fittings advisably take the form of belts (5) consisting of hemp or cotton, the ends of which may, for example, be connected for fastening purposes with VELCRO fasteners (5'). Other fastening fittings will be explained in further detail below.

In connection with FIG. 2, it is explained in greater detail below how the angular shock-absorbing inserts (3) or (3') are constructed and attached to the inner corner areas of protective covering (1). The insert runs according to FIG. 2 in such a way that it describes roughly a right angle in the case illustrated, where a bulge-like corner area (3") preferably runs roughly diagonal to and projects outward from the formed angle. Insert (3) or (3') is preferably constructed of strip-shaped parts in that the side areas of these parts are attached to the inner sides of the two opposing side parts (2',2"), advisably stitched in place, and in that the other sides of the former parts which project beyond side parts (2',2") are put together, whereupon a holding strip (6) is placed over the two contacting parts. The two parts are then connected to each other and the holding strip (6) by at least one seam (7) extending through the two parts and the holding strip (6). This is how the already mentioned edge area of protective covering (1) is produced, which fulfills both a shock-absorbing and a guiding function. The shock-absorbing function, in particular, is increased by the diagonally outward-projecting corner area (3"). During transport, it is precisely this corner area (3") which is particularly threatened by shocks. It is also conceivable to form the angled insert (3,3') from a strip-shaped part, which is preferably bent in the middle in the proper way to bring about the angle and the corner area (3").

The stitching of inserts (3') to the upper edges of side parts (2',2") and the edges of upper part (2) takes place in a corresponding fashion, where the arms of angular insert (3') which are stitched to upper side part (2) and the corresponding arms of the vertically extending insert (3) can be formed in one piece, whereas the arms of insert (3') which are stitched to the upper edges of side parts (2',2") and the adjacent edges of vertical insert (3) are separated be cutouts.

It is especially preferred that inserts (3,3') consist of a felt material of a preset thickness.

In order to prevent the arms of insert (3 and 3') from bending inward in an undesirable manner, a longitudinal incision (3"') on the inner side of the arms can be provided which produces or promotes a spreading of the arms. In FIGS. 1 and 2 this is schematically illustrated by the dotted line. For an insert thickness of 5 mm, the incision runs about 4 mm deep into the arms.

Another design of protective covering (1) is described in the following in connection with FIG. 3, in which elastic areas (8) illustrated by dotted lines are provided that enable the pulling apart of protective covering (1) perpendicular to the longitudinal direction of areas (8), so that a fitting of protective covering (1) to objects (4) of differing sizes is possible without further effort. For example, such elastic areas (8) run perpendicular to a possible vertical middle plane and/or elastic areas (8') run perpendicular to the other possible vertical middle plane (8') and/or elastic areas (8") perpendicular to the horizontal middle plane. In case of the provision of areas (8) and/or (8') and/or (8"), an adaptation preferably with respect to the length and/or width and/or height of the objects (4) is possible. Elastic areas (8), (8') or (8") preferably have the form of areas gathered up by rubber bands or the like which automatically pull apart for fitting during application of protective covering (1) to object (4). Areas (8, 8', 8") can also be formed in such a way that twines or the like running in channels perpendicular to their longitudinal extension, along which the material of the corresponding side parts can be displaced to produce folds (shortening the side part) and unfold (lengthening the side part).

In order to enable the protection of object (4), padded paperboard or felt parts can be inserted between the two opposing edges of the arms of inserts (3), the opposing surfaces of side parts (2') or (2") and the surfaces of object (4). It is also conceivable, as illustrated schematically in FIG. 1 for the front side part (2'), to provide strip-shaped shock-absorbing elements (30), preferably also consisting of felt, between the vertical inserts (3) on the middle area of the inner surface of side part (2').

In connection with FIG. 4, a protective covering (10) for an object (4) with a circular cross section is illustrated. Protective covering (10) consists of an upper part (20) which is connected, and preferably stitched, to a side part (21), so that protective covering (10) features the shape of a hollow cylinder with a circular cross section. To provide protection for object (4), there are several strip-shaped inserts (30) on the inner surface of side part (21), mutually separated by a spacing in the longitudinal direction and preferably consisting of felt, these are attached, preferably by stitching and run from the bottom rim of side part (21) to upper part (20). These inserts, according to FIG. 4a, may also feature outward projections (30'), which roughly correspond to the corner areas of FIG. 2. Similar inserts, with or without projections can also be provided between upper part (20) and side part (21), as illustrated schematically by the dotted lines in FIG. 4, where the appropriate incisions permitting bending have been provided.

FIG. 5 illustrates a protective covering (11) for an object, for example, with a triangular cross section. Protective covering (11) consists of an upper part (22) and side parts (23, 23', 23") which surround the object above and from the side, respectively, when the protective covering (11) is applied to the object. As with the embodiment of FIG. 1, strip-shaped elastic inserts (31) are arranged in the corner areas of the side parts and, if needed, also in the corner area between the edges of upper part (22) and side parts (23, 23', 23"). These preferably consist of felt and can be shaped in accordance with FIG. 2. It is also conceivable to fit the present protective coverings to arbitrary other shapes of objects (oval and quadrilateral forms for instance), which are easily prone to shocks, corner areas in particular, are provided with the elastic inserts as described.

As accessories for the protective covering (1, 10 or 11), it is possible to provide small sacks consisting of cotton, jute, linen or some other degradable material, particularly textile material, in which accessory parts, such as screws, nuts, angle braces, cables and the like are packed.

In relationship to FIG. 6, particularly preferred means of fastening protective covering (1) to object (4) will be discussed in the following.

FIG. 6 shows a bottom view of a packaging material (1) arranged on an object (4). Details in FIG. 6 that have already been explained in connection with FIGS. 1 and 2 are identified in the same way. In the manner recognizable from the figure, the lower edges of side parts (2',2") below the bottom side of the object (4) present in protective covering (1) feature foldable flap areas attached, preferably stitched onto side parts (2,2') or formed in one piece with the latter. The flap areas (40) in the corner areas of protective covering (1) are preferably shaped in such a way that they touch one another there. In the case of a protective covering (1) featuring a rectangular cross section each edge (41) of a flap area (40) preferably forms an angle of, for instance, 45° with the lower rim of the corresponding side part. The edges of flap area (40) which point inward are preferably folded over and mutually connected in such a way that they form a channel (42) through which a twine or the like runs. The end parts of the twine (43) which emerges in a corner area of two flap areas (40) and runs in an annular manner through channel (42), are led through a closure (44) which can be slid along these end parts and can connect any two points of the end parts. The closure (44) is preferably the illustrated twine stopper, as is known, for instance from rucksacks. Before packaging an object (4) the stopper is pushed sufficiently far outward along the end parts of twine (43) that the flap areas (40) can at least be brought into the plane of the corresponding side walls (2',2"). For fastening the protective covering (1) on object (4) the closure (44) is pushed inward and locked, where the flap areas (40) are moved inward into the position of FIG. 6, in which they surround the bottom side of the object (4).

Such fastening fittings are also conceivable in the embodiments of FIGS. 4 and 5.

A further development of the invention is seen from FIG. 7, according to which a covering (50) can be placed upon the opening area of the protective covering (1) applied to object (4). The covering can have the form of a cap with side areas (52,53,54,55) attached to its front surface (51), where in the end areas inserts (3) as explained in connection with FIG. 2 can be provided between the side areas (52,53,54,55) and the front surface (51). In the case in which the covering (50) features an elastic area (8) for adaptation to objects of different sizes in its front surface (51), the edge areas (53,55) are lacking in the extension of this elastic area (8), or there are also corresponding elastic areas provided in the latter.

To attach cover (50) to the assembled protective covering (1), at least two belt bands (56) separated by a distance are connected, preferably by stitching, to at least two opposing side areas (52,54); said belt bands may be fastened in particular with VELCRO (hook and loop) closure parts (57) to protective covering (1) which has appropriately arranged VELCRO closure parts (57) on its corresponding side parts. The VELCRO closure parts (57) are arranged on the belt bands (56) away from important seams in such a way that they can simply be cut off for disposal. The VELCRO closure parts (57) are preferably located, as shown, at the ends of belt bands (56).

Cover (51), belt bands (56), inserts (3) and area (8) can consist of the material described above in connection with protective covering (1) or they may be constructed in the manner described above.

In accordance with FIG. 8, which shows a section through a corner area, it is also conceivable to construct the shock-absorbing devices in the corner areas by forming channels (60), advisably by sewing on a web of material (61), to bridge over the corner area, and inserting the shock-absorbing fittings (62) into the channels. These fittings (62) may consist of a nondegrading material and be removed from the channels before disposal of the packaging, so that they can either be disposed of separately or be reused in other packaging. For instance, these fittings (62) may take the form of rod-shaped, elastic rubber or foamed plastic parts. To form fittings (62, it is also conceivable to insert elongated hose-like plastic parts into channels (60). In accordance with FIG. 9, it is also conceivable that corner protection elements (65) can be inserted into the corner areas, preferably from the inside, and affixed there; the former consist of a relatively stiff, but still elastic and therefore shock-absorbing material, preferably a degradable felt material of a predetermined thickness. The corner protecting elements (65) also serve to guide and align the protective covering during its mounting on object (4) in such a way that the corner protection elements (65) end up in the corner areas and are held in the proper positions on the latter.

In accordance with FIG. 10, it is possible to provide the present packaging with a shock-absorbing protective area (70), formed for instance of a degradable felt material, in a predetermined area on the inside of one side part in order to cover an area (71) of object (4) in need of particular protection after assembly; said area may consist of a control panel with shock-sensitive display devices and switches, etc.

Figure 11:
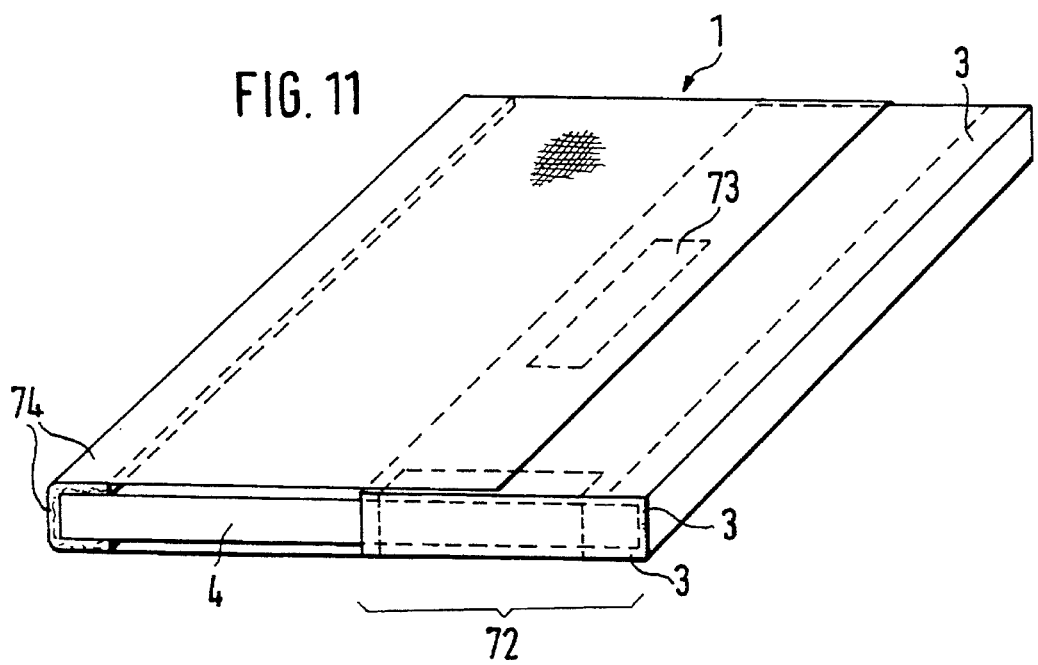

FIG. 11 presents a packaging of the present type in which the protective covering (1) is adapted to the form of a panel-shaped object (4) which may be the counter top of a kitchen cabinet assembly. One side of protective covering (1) features a pocket-like intake part (72) into which the panel-shaped object is inserted. At least the edges of intake part (72) which run in the longitudinal direction are provided with shock-absorbing inserts (3). The other side of protective covering (1) is shaped in such a way that it can be folded around the other end of object (4) like an envelope and fastened to intake part (72) with a VELCRO closure (73) or some other fitting. In its edge area, the other side of protective covering (1) features a longitudinally running shock-absorbing fitting, preferably in the form of a degradable felt strip (74) which protectively surrounds the corresponding end edges of object (4) and is bent into an angle during the assembly of protective covering (1). The intake area can preferably also be provided with inserts (3) in the transverse direction.

The protective covering can be adapted in the longitudinal direction to the largest possible panel-shaped object. For packaging smaller objects, the excess area of the protective covering is simply folded over the packaged object.

An additional embodiment of the present packaging will now be discussed in connection with FIG. 12, an embodiment in which protective covering (1) is provided with the described shock-absorbing inserts (3) in the area of the edges of its openings and in the area of the edges of its upper part (2) opposite the opening. The fastening of this protective covering (1) to an object (4) can be accomplished by means of the flap areas (40) which, as described above, are held together with twines (not shown) or with the material segments (45), possibly in the form of rubber belts or the like, which connect the slanted inner edges of the flap areas (40).

It is also possible to provide the protective coverings described above with a protective felt layer over their entire inside surface, where, however, the corner and edge areas are provided with the inserts or corner protection areas described above. In the case of a possible fitting to different sizes of objects, in accordance with FIG. 3, this felt layer is then interrupted in the corresponding elastic areas, where, in the contracted state of the elastic areas, the interruption of the felt layer is closed, and the corresponding areas of the respective side or upper part are folded in the area of the closed interruption. In order to achieve certain cushioning effects, the felt layer described can be stitched with quilting seams on the side or upper parts, or if desired, in the flap areas.

It was described that protective covering (1) is pulled onto object (4) from top to bottom. It is also conceivable, however, to pull protective covering (1) from any arbitrary side of object (4) to its opposing side.

Figure 13:
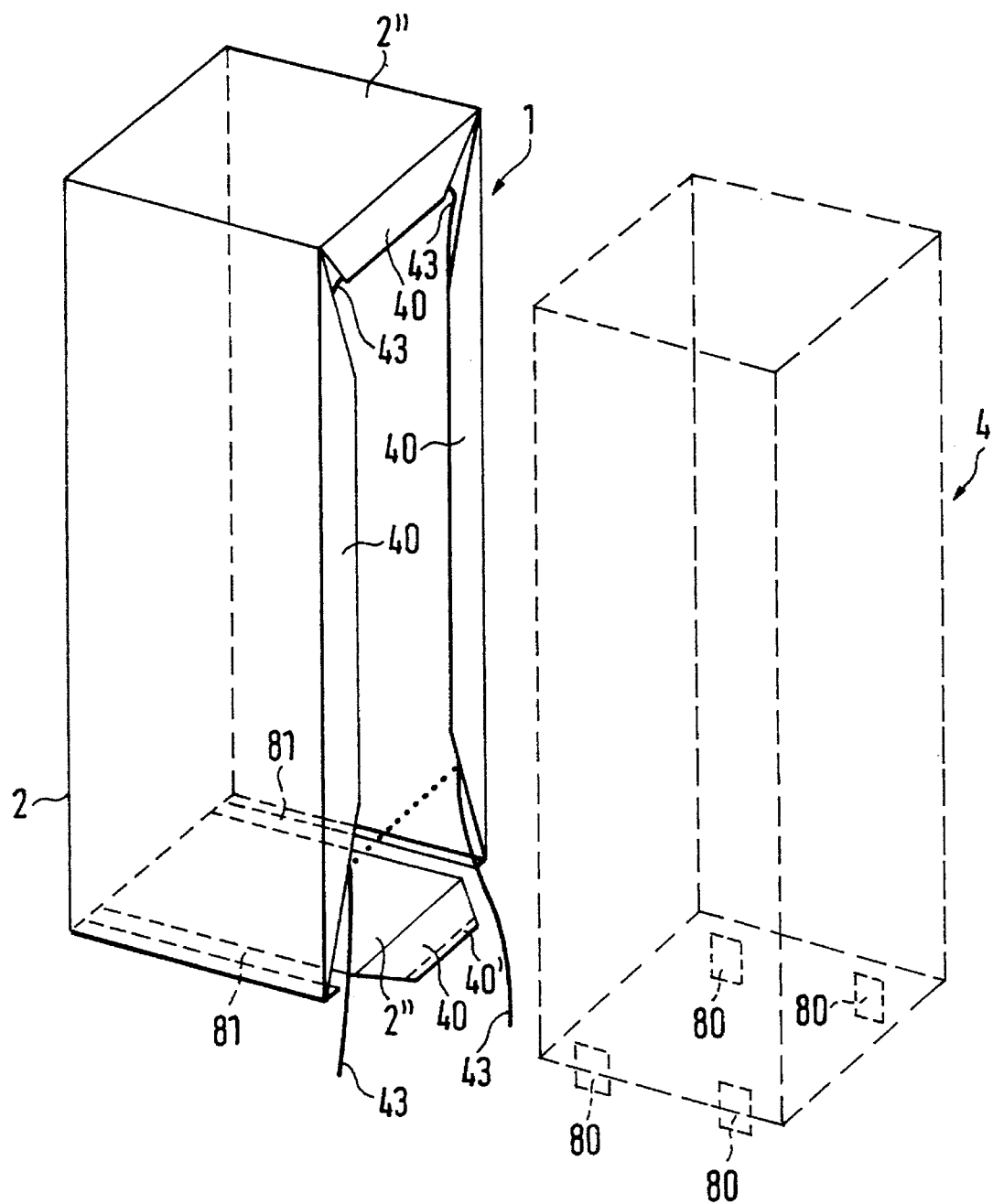

FIG. 13 describes another embodiment of the present invention, which is especially suited for packaging relatively tall built-in cabinets and the like, where the protective covering is pulled over the cabinet (4) from one side. Since cabinet (4) has foot parts (80) on its bottom, slits (81) are present in the appropriate side part (2"), running from upper part (2) in the direction of insertion, that is perpendicular to upper part (2) and preferably opening outward on the edge of side part (2") opposite upper part (2). In this way, foot elements (80) can penetrate through slits (81) even during the drawing-on operation; if a fastening of protective covering (1) is accomplished by the illustrated attachments flaps (40), then the twine (43) which runs through the channels of the upper and the lateral fastening flaps (40) is drawn through the channel of lower fastening flap (40') and drawn tight in the manner described above.

In this embodiment it is also conceivable to attach the outer ends of twine (43) along the dotted line illustrated and to lengthen the flap part (40) of lower side part (2"), which need not have a channel in this case, to such an extent that it can be drawn over the fastened ends of twine (43) and then folded back down. The fastening of the flap area is then accomplished with the assistance of a fastening fitting on the folded up portion of flap (40). The fastening fitting preferably consists of VELCRO closure parts.

The above-described angular elements perform another essential function in addition to a shock-absorbing function. During application of the protective covering to the object they act as a kind of "guide rail," since they stiffen the protective covering. In this way the protective covering can be quite simply pushed onto the object from one side without the danger that the end of the protective covering, still away from the object, will twist or bend in a manner that would disrupt the pushing-on operation, as could easily happen without the provision of the shock-absorbing corner elements, owing to the flexibility of the material used in the side parts and the upper part. The protective covering described in the cited patent application can therefore be applied particularly well to objects by robotic machines, which preferably grab the lower part of the protective covering with four gripper arms or the like and pull it over the object. If the corner elements are found only in edge areas of the side wall opposite the opening one can achieve an automatic adjustment of this side wall to the corresponding front face of the object during application of the protective covering.

By means of the roll-shaped areas of the corner elements projecting roughly diagonally outward with respect to the angle formed, a special protection against shock impact during transport is achieved for the corresponding edges of the object.

In the following, types of packaging are described in which the formation of the angular corner elements is relatively simple.

An essential advantage of these types of packaging in accordance with the invention consists in the fact that the angular corner elements can be produced in a relatively simple and therefore economical manner. The result is that the entire packaging can be produced more economically. With this packaging in accordance with the invention, it is, in particular, not necessary to stitch an extra felt strip or the like on the side parts of the protective covering in a separate fastening operation. The fastening of a special enclosure belt is likewise not required.

An essential advantage of a specially preferred embodiment of the of this packaging in accordance with the invention consists in the fact that, as a result of the folding-over of the edge areas of the sidewalls toward the outside there are no parts present in the formed corner areas on the inside of the packaging that could catch on an object during insertion.

Figure 14:
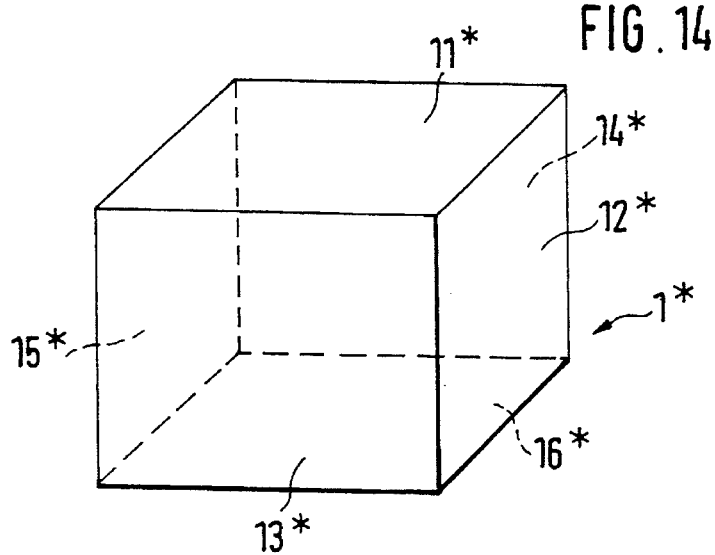

In accordance with FIG. 14, a packaging ($1^x$) meant for packaging a cuboid object consists essentially of a quadrilateral first side wall ($11^x$) opposite an opening ($16^x$) and side walls ($12^x, 13^x, 14^x, 15^x$) adjacent at right angles to the first side wall. The rim areas of ($12^x, 13^x, 14^x$ & $15^x$) surround opening ($16^x$), through which an object, not shown, is inserted into protective covering ($1^x$).

Side walls ($11^x$–$15^x$) consist preferably of felt or nonwoven fiber material, which may be composed of natural fibers, artificial fibers of mixed fibers. In case artificial fibers are employed, the packaging can be remelted after being removed from service and employed to produce new artificial fibers. Natural fibers can be put to another use as filler materials, cleaning pads or cleaning rags. In case mixed fibers are used, which can be obtained particularly economically, for instance, by tearing up used textiles or textile waste of the type that accumulates during the production and finishing of textile yard goods, and then pressing the fibers, possibly adding binders, they can be reused by an additional tearing up and pressing process, possibly adding binders.

Figure 15:
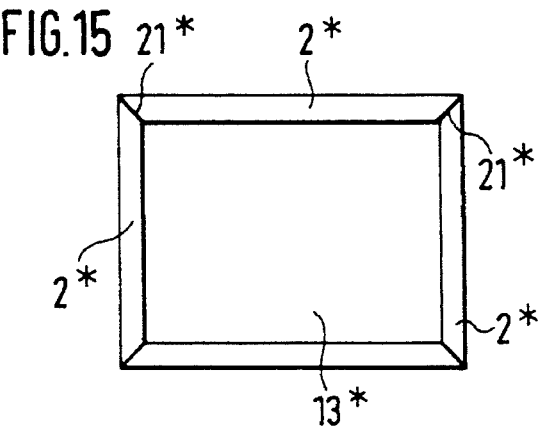

To produce angular, shock-absorbing corner elements ($8^x$ or $8'^x$) (see FIG. 16 or FIG. 17), the edge areas of side parts ($11^x$–$15^x$) are folded over in the manner with the example of side part ($13^x$) illustrated in FIG. 15, to come to lie against the material of side part ($13^x$). The folded-over areas ($2^x$) are preferably cut off at a diagonal slant in the corners of side part ($13^x$) so that they do not overlap in those corner areas. The folded-over areas ($2^x$) are specifically cut in at partial angles to create the right angle of the corresponding corner, preferably at angles of 45°, so that the angled edges ($21^x$) of the folded-over areas touch in the corner ($2^x$).

It is pointed out that the above-described folded-over areas ($2^x$) are preferably provided on all edge areas of side wall parts $12^x$–$15^x$). It is also conceivable, however, to provide angular corner elements ($8^x$) or ($8'^x$) only at predetermined edge areas of side wall parts ($11^x$–$15^x$). Specifically, it is possible to forego these angular corner elements in the rim area of opening ($16^x$) of side wall parts ($11^x$–$15^x$), as is subsequently explained in greater detail.

Figure 16:
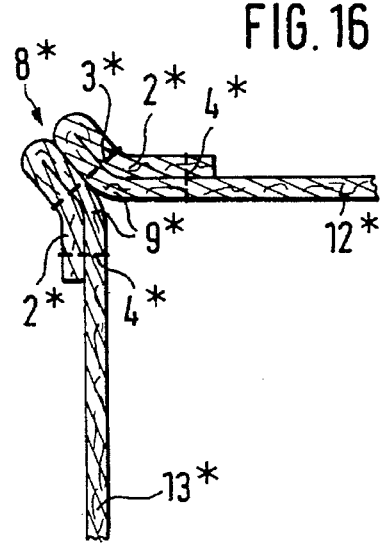

In accordance with FIG. 16, it is particularly preferred that the folded areas be turned outward and be attached to the respective side wall part, preferably by stitching, with the assistance of a seam ($4^x$) in the end area of the folded-over area. In FIG. 16 the example of an angular corner element between side wall parts ($12^x$) and ($13^x$) is illustrated. Instead of using a seam ($4^x$), it is also conceivable to attach the folded-over areas ($2^x$) to side wall parts ($12^x$) and ($13^x$) in a different manner, for example, by gluing or thermal heating.

To form the angular corner element ($8^x$) running along the common edge between side wall parts ($12^x$) and ($13^x$), the free end areas of the folded-over areas ($2^x$) of side wall parts ($12^x$) and ($13^x$) are attached. This is preferably accomplished by means of a single seam ($3^x$) using stitching, adhesion or thermal attachment.

In order to facilitate the opening of side wall parts ($12^x$) and ($13^x$) now attached by angular corner element ($8^x$), one can form impression or incision lines ($9^x$) along side wall parts ($12^x$) and ($13^x$) to facilitate the bending back of side wall parts ($12^x$) and ($13^x$) and the formation of a corner angle of 90°.

In the embodiment of FIG. 16 it is particularly advantageous that a clean corner arises on the interior of the protective covering ($1^x$) between side wall parts ($12^x$) and ($13^x$) as a result of the folding back of areas ($2^x$) towards the outside, in which the corresponding corner area of the object to be packaged can travel unhindered from the area of opening ($16^x$) all the way to the upper wall ($11^x$) and slide smoothly along the corner element until it makes contact with the latter.

Figure 17:
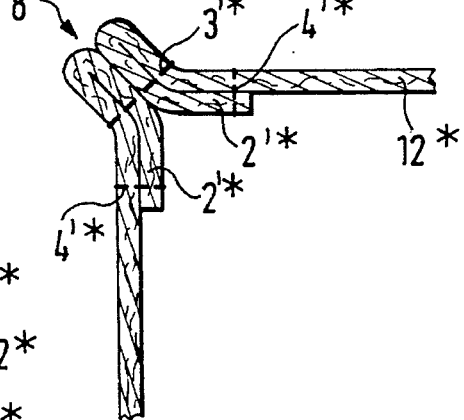

FIG. 17 illustrates an embodiment of the present packaging, which essentially corresponds to that of FIG. 16, but where the folded-over areas ($2^x$) are folded inward.

Figure 18:
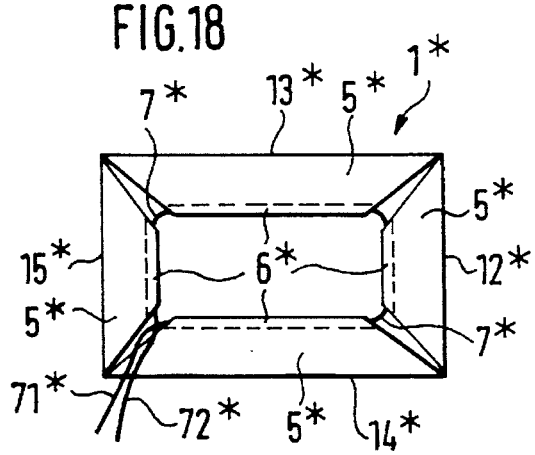

FIG. 18 illustrates a preferred installation for closing protective covering ($1^x$) after packaging an object ($G^x$). This installation consists of lap parts ($5^x$) attached to or part of side wall parts ($12^x$–$15^x$), which can be folded inward after pushing protective covering ($1^x$) over object $G^x$. The end areas of flap parts ($5^x$) preferably feature channels ($6^x$), in which a tensioning device ($7^x$), advisably a twine or the like, is guided. The channels are preferably formed by folding over, or more specifically sewing over, a part of the end areas of flap parts ($6^x$). After the packaging of the object, the two end areas ($71^x$) and ($72^x$) of tensioning device ($7^x$) are fastened together, which may, for instance, be accomplished by tying a knot or with aid of a so-called twine stopper (not shown), so that the flap areas ($6^x$) are stretched over the front surface of object ($G^x$).

Instead of the tensioning device described above other fastening means may be provided, in the form of VELCRO closures, for instance. It is also conceivable to provide only two opposing flap parts or three flap parts rather than the four flap parts ($5^x$).

Flap parts ($6^x$) can either be constructed in one piece with the corresponding side wall parts ($12^x$–$15^x$), in which case they are simply folded over from the rim area of opening ($16^x$), or they may be added to the lower ends of side wall parts ($12^x$–$15^x$) by arranging corner elements ($8^x$) or ($8^{\prime x}$) corresponding to FIGS. 16 and 17 respectively.

It is also conceivable to produce the channels in flap parts ($5^x$) by folding material strips in the middle, in which case the superimposed ends of the folded strip are attached, advisably by stitching, to the lower ends of the respective side wall part ($12^x$–$15^x$). Here, the one half of the material strip can also be attached in one piece to the respective side part ($12^x$–$15^x$).

Figure 19A:
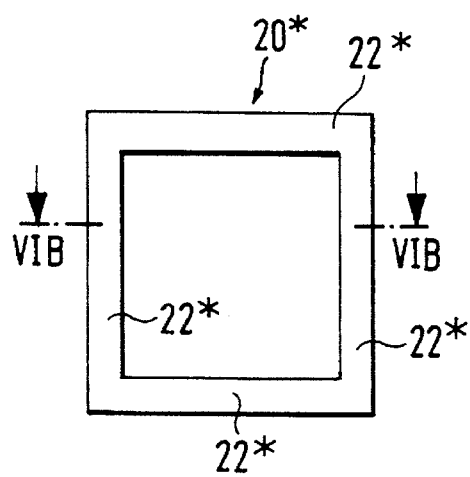
Figure 19B:
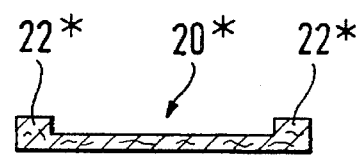

Further developments of the invention will be discussed in connection with FIGS. 19A,B and 20A,B, in which side wall parts ($11^x$–$15^x$) are produced from prefabricated wall parts ($20^x$) which feature a greater thickness at those edge areas on which corner elements are to be provided than in the other areas. Such wall parts ($20^x$), for instance, can be produced by stamping and cutting operations, where a felt or nonwoven fiber material that features the larger thickness of the area is compressed to the lesser thickness outside the edge area by a stamping operation. Simultaneous with the stamping operation, wall part ($20^x$) can be cut to the desired size of side wall parts ($11^x$–$15^x$). In accordance with FIGS. 19A,B, such a wall part ($20^x$) shows the greater thickness in its edge areas ($22^x$).

Figure 20A:
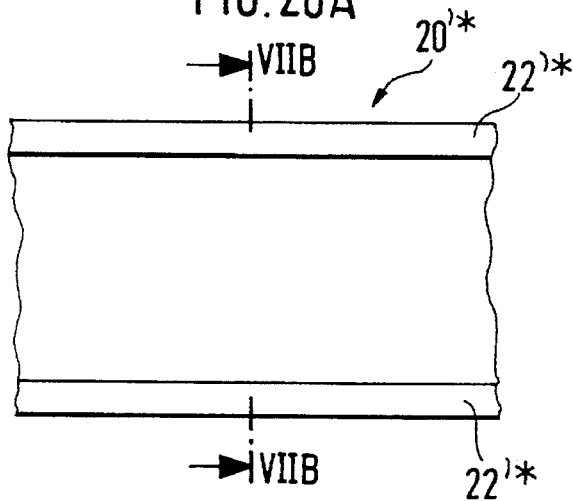
Figure 20B:
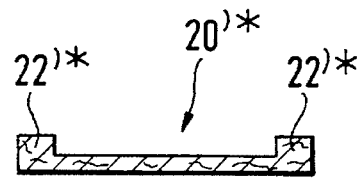

In accordance with FIGS. 20A,B, side wall parts ($11^x$–$15^x$) which are intended to have angular shock-absorbing parts on opposing edges can be produced by simply cutting off parts of the desired length from a web-form felt or nonwoven fiber material ($20^{\prime x}$), which has been stamped in such a way that its two opposing edge areas $22^{\prime x}$ show a greater thickness.

As an example, wall parts ($20^x$,$20^{\prime x}$) show a thickness of roughly 2 cm in the edge areas $22^x$, $22^{\prime x}$ while they have a thickness of roughly 1 cm in the remaining areas.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

I claim:

1. Packaging for protectively enclosing an object on a first surface and at least one adjacent surface in the packaged state, comprising a flexible protective covering with an opening area slippable over an object; and shock-absorbing devices of a predetermined strength being provided in at least some edge areas of the protective covering so that they provide a guiding or aligning means during the application of the protective covering to an object, said shock absorbing devices being arranged in at least two opposing edge areas between the upper surface part and the side parts, said shock absorbing devices formed as angled inserts extending along the edge areas, each angled insert including two strip shaped material pieces angled and fastened together in a junction area so that in the junction area between said two strip shaped material pieces where the two strip shaped material pieces of the angle meet, an outwardly extending corner area is created extending substantially as a radial extension of said junction area.

2. Packaging in accordance with claim 1, wherein the protective covering consists of a degradable material.

3. Packaging in accordance with claim 2, wherein the material is one of cotton, jute or linen.

4. Packaging in accordance with claim 1, wherein the protective covering has means at said opening area for fastening the protective covering on an object.

5. Packaging in accordance with claim 1, comprising a quadrilateral upper surface part having four edges and side parts arranged at the edges of the upper surface part, said upper surface part covering a top portion of a quadrilateral object and said side parts covering plural sides of said object.

6. Packaging in accordance with claim 5, wherein said side parts have edge areas having a lower rim area and shock-absorbing devices arranged in the edge areas of the side parts and starting from the upper surface part, extending substantially to the lower rim area of the side parts.

7. Packaging in accordance with claim 6, wherein plural inserts define strips spaced apart from each other on the interior side of the side parts, which extend substantially from the upper surface part to a lower rim of the side parts.

8. Packaging in accordance with claim 6, wherein said side parts include a first side part and a second side part and a first belt and a second belt of a degradable material, said first belt is attached to said first side part and said second belt is attached to said second side part, said first and second belts having a sufficient length to allow attaching said first belt to said second belt.

9. Packaging in accordance with claim 8, wherein ends of said belts are provided with hook and look enclosures.

10. Packaging in accordance with claim 6, wherein the lower end of each of the side parts feature inward-pointing flap areas on which channels are formed, through which a string material extends, which is led outward between two adjacent flap areas.

11. Packaging in accordance with claim 10, wherein free end areas of the string material extend through a friction closure which can be displaced along the free end areas of the string material in order to open and close the fastening arrangement formed by the flap areas.

12. Packaging in accordance with claim 5, wherein incisions are made from inside of said protective covering into said strips and said incisions extending along and extend a predetermined depth into the arms.

13. Packaging in accordance with claim 5, wherein the upper surface part and in the side part of said protective covering are elastic areas perpendicular to a longitudinal plane extending through the upper surface part perpendicular to the oblique plane through the upper surface part.

14. Packaging in accordance with claim 13, wherein the elastic areas are provided by resilient bands.

15. Packaging in accordance with claim 14, wherein the resilient bands are rubber bands.

16. Packaging in accordance with claim 13, wherein the elastic areas, formed by string material, are led through channels on the upper surface part and the side parts, by means of which the areas can be tightened as desired through the formation of folds.

17. Packaging in accordance with claim 5, wherein each of two adjacent side parts extends over one arm of the angled inserts and is attached to it, a belt band extending over the end edges of the side parts and the corner area of the angle inserts, and the belt band is attached at the corner area.

18. Packaging in accordance with claim 17, wherein the belt band is fastened by at least one seam extending through the corner area.

19. Packaging in accordance with claim 1, wherein the shock-absorbing device has the form of shock-absorbing corner protection elements attached from the inside to corner areas of the protective covering and adapted to the form of the corners of the object.

20. Packaging in accordance with claim 1, wherein the shock-absorbing devices consist of a degradable material.

21. Packaging in accordance with claim 20, wherein the shock-absorbing devices consist of felt of a predetermined thickness.

22. Packaging in accordance with claim 1, wherein each of the shock-absorbing devices takes the form of an insert, which can be inserted into channels formed in the edge areas.

23. Packaging in accordance with claim 22, wherein the insert is one of a rod, elastic rubber, foamed plastic part, or an inflatable, tubular plastic part.

24. Packaging in accordance with claim 1, wherein a cover closing the opening area of the assembled protective covering is provided, which features a front surface, onto which side parts are attached on at least two opposing edges and extend over the corresponding side parts of the assembled protective covering.

25. Packaging in accordance with claim 24, wherein the shock-absorbing devices are arranged in edge areas between the front surface and the corresponding side areas.

26. Packaging in accordance with claim 24, wherein belt bands are attached on at least two opposing side areas for attaching the cover to the protective covering.

27. Packaging in accordance with claim 26, wherein belt bands feature hook and loop closure parts which can be attached to corresponding hook and loop closure parts of the protective covering.

28. Packaging in accordance with claim 26, wherein the belt bands consist of a degradable material.

29. Packaging in accordance with claim 24, wherein the covering features at least one elastic area in the front surface, which runs parallel to a side edge of the front surface.

30. Packaging in accordance with claim 29, wherein each elastic area is a resilient band.

31. Packaging in accordance with claim 24, wherein the front surface and the side parts consist of a degradable material.

32. Packaging in accordance with claim 31, wherein the material is one of cotton, jute or linen.

33. Packaging in accordance with claim 1, wherein a shock-absorbing protective area is provided on the inside of the protective covering, which covers an area of the object in need of protection when the protective covering has been put on.

34. Packaging in accordance with claim 1, wherein the side part covering a bottom wall of a packaged object with foot parts features cutouts for the foot parts.

35. Packaging in accordance with claim 34, wherein the cutouts have the form of slits which run in the insertion direction of the protective covering from the upper side part.

36. Packaging in accordance with claim 35, wherein the slits open up on the edge of the side part pointed away from the upper side part.

37. Packaging for protectively enclosing an object on a first surface and at least one adjacent surface in the packaged state, comprising:

a flexible protective covering with an opening area slippable over an object; and shock-absorbing devices of a predetermined strength being provided in at least some edge areas of the protective covering so that they provide a guiding or aligning means during the application of the protective covering to an object, an upper surface part and side parts of said protective covering fitted to an object with a rectangular cross section, include elastic areas extending perpendicular to a plane parallel to said upper surface part and said side parts extending perpendicular to a longitudinal plane extending through said upper surface part, and elastic areas perpendicular to the oblique plane through said upper surface part.

38. Packaging in accordance with claim 37, wherein the elastic areas take the form of areas tightened by resilient bands.

39. Packaging in accordance with claim 38, wherein the resilient bands are rubber bands.

40. Packaging in accordance with claim 37, wherein the elastic areas, formed by string material, are led through channels on said upper surface part and said side parts, by means of which the areas can be tightened as desired through the formation of folds.

* * * * *